United States Patent

Suzuki et al.

Patent Number: 6,005,702
Date of Patent: Dec. 21, 1999

[54] OPTICAL TRANSMISSION DEVICE, WDM OPTICAL TRANSMISSION APPARATUS, AND OPTICAL TRANSMISSION SYSTEM USING RETURN-TO-ZERO OPTICAL PULSES

[75] Inventors: Masatoshi Suzuki; Itsuro Morita; Noboru Edagawa; Shu Yamamoto, all of Saitamaken; Shigeyuki Akiba, Tokyo, all of Japan

[73] Assignee: Kokusai Denshin Denwa Kabushiki-Kaisha, Japan

[21] Appl. No.: 08/802,698

[22] Filed: Feb. 19, 1997

[30] Foreign Application Priority Data

Feb. 23, 1996 [JP] Japan ................... 8-036759

[51] Int. Cl.$^6$ .......... H04B 10/04; H04B 10/12; H04J 14/02
[52] U.S. Cl. .......... 359/183; 359/124; 359/133; 359/134; 359/161; 359/173; 359/181; 359/182
[58] Field of Search .......... 359/124, 125, 359/133, 134, 132, 179, 181, 182, 183–186, 161, 158, 173

[56] References Cited

U.S. PATENT DOCUMENTS

| 5,467,213 | 11/1995 | Kaede et al. | 359/179 |
| 5,477,375 | 12/1995 | Korotky et al. | 359/183 |
| 5,625,479 | 4/1997 | Suzuki et al. | 359/183 |
| 5,675,429 | 10/1997 | Henmi et al. | 359/179 |
| 5,737,110 | 4/1998 | Suzuki et al. | 359/179 |
| 5,745,613 | 4/1998 | Fukuchi et al. | 359/181 |
| 5,781,673 | 7/1998 | Reed et al. | 359/159 |

Primary Examiner—Leslie Pascal
Attorney, Agent, or Firm—Banner & Witcoff, Ltd.

[57] ABSTRACT

An optical transmission device using return-to-zero optical pulses as transmission optical pulses, which is capable of enhancing a transmission distance as well as a wavelength range with satisfactory transmission characteristics and enabling an easy realization of the wavelength division multiplexing optical transmission. The optical transmission device is formed by an optical transmitter for transmitting transmission optical pulses by superposing digital data signals onto return-to-zero optical pulses, and a modulator for applying one of a phase modulation and a frequency modulation in synchronization with a transmission rate of the transmission optical pulses, to the transmission optical pulses transmitted by the optical transmitter. This optical transmission device can be utilized in forming a wavelength division multiplexing optical transmission apparatus and an optical transmission system.

20 Claims, 5 Drawing Sheets

OPTICAL TRANSMISSION DEVICE, WDM OPTICAL TRANSMISSION APPARATUS, AND OPTICAL TRANSMISSION SYSTEM USING RETURN-TO-ZERO OPTICAL PULSES

BACKGROUND OF TEE INVENTION

1. Field of the Invention

The present invention relates to an optical transmission device using return-to-zero optical pulses as transmission optical pulses, which Is capable of enhancing a transmission distance as well as a wavelength range with satisfactory transmission characteristics and enabling an easy realization of the wavelength division multiplexing optical transmission. The present invention also relates to a wavelength division multiplexing (WDM) optical transmission apparatus and an optical transmission system formed by utilizing such an optical transmission device.

2. Description of the Background Art

In recent years, due to the advance of the optical amplification technique, the optical fiber communication technique has been progressed to realize a very long distance communication, and it is now becoming possible to realize the transoceanic communication using optical submarine cables without requiring regenerators. As a transmission scheme for enabling a high speed, large capacity realization of such an optical communication using optical fibers, an optical soliton transmission using return-to-zero optical pulses as transmission optical pulses has been attracting much attention.

However, this optical soliton transmission is associated with a random variation of optical signal wavelength due to optical amplifier noises and a nonlinear effect of optical fibers, and a random jitter (known as Gordon Haus dynamic jitter) of pulse arrival time at a receiving terminal due to dispersion by optical fibers and there has been a problem that a transmission distance is limited because of these random timing jitters.

As a solution to resolve this problem, there has been a proposition of a scheme in which a mean dispersion of the system is made smaller by periodically compensating the accumulated dispersion of transmission fibers to a nearly zero level using dispersion compensation fibers, so that a random jitter of optical signal wavelength due to optical amplifier noises and a nonlinear effect of optical fibers will not be converted into the dynamic timing jitter.

However, according to the analysis made by the present inventors, this scheme limits the optimum wavelength range so that, in a case of multiple wavelengths transmission, the accumulated residual dispersion becomes large for long wavelength signals and it is difficult to realize a long distance transmission.

In addition, at a wavelength with the optimum dispersion compensation for which a mean dispersion is small, this scheme causes an excessive spectrum spread, so that there is a need to use a large wavelength interval in order to avoid interferences among different wavelengths, even when the dispersion slope of optical fibers is compensated to realize a nearly optimum value for the residual dispersion at each wavelength, and for this reason, there is a problem that it is difficult to utilize the optical amplifier bandwidth efficiently.

SUMMARY OF THE INVENTION

It Is therefore an object of the present invention to provide an optical transmission device using return-to-zero optical pulses as transmission optical pulses, which is capable of enhancing a transmission distance as well as a wavelength range with satisfactory transmission characteristics and enabling an easy realization of the wavelength division multiplexing optical transmission.

It is another object of the present invention to provide a wavelength division multiplexing (WDM) optical transmission apparatus and an optical transmission system formed by utilizing such an optical transmission device.

According to one aspect of the present invention there is provided an optical transmission device, comprising: an optical transmitter for transmitting transmission optical pulses by superposing digital data signals onto return-to-zero optical pulses; and modulator means for applying one of a phase modulation and a frequency modulation in synchronization with a transmission rate of the transmission optical pulses, to the transmission optical pulses transmitted by the optical transmitter.

According to another aspect of the present invention there is provided a wavelength division multiplexing optical transmission apparatus, comprising: a plurality of optical transmitters for generating respective transmission optical pulses in different wavelengths according to a wavelength division multiplexing scheme by superposing respective digital data signals onto return-to-zero optical pulses; and a plurality of modulator means, respectively connected with said plurality of optical transmitters, for applying one of a phase modulation and a frequency modulation in synchronization with transmission rates of the respective transmission optical pulses, to the respective transmission optical pulses transmitted by the respective optical transmitters.

According to another aspect of the present invention there is provided an optical transmission system, comprising: an optical transmission device formed by an optical transmitter for transmitting transmission optical pulses by superposing digital data signals onto return-to-zero optical pulses, and modulator means for applying one of a phase modulation and a frequency modulation In synchronization with a transmission rate of the transmission optical pulses, to the transmission optical pulses transmitted by the optical transmitter; an optical receiver for receiving the transmission optical pulses transmitted from the optical transmission device; transmission optical fibers for connecting the optical transmission device and the optical receiver; and a plurality of optical amplifier repeaters provided on the transmission optical fibers, for compensating a loss of the transmission optical fibers.

According to another aspect of the present invention there is provided an optical transmission system, comprising: a plurality of optical transmission devices formed by a plurality of optical transmitters for transmitting respective transmission optical pulses in different wavelengths according to a wavelength division multiplexing scheme by superposing respective digital data signals onto return-to-zero optical pulses, and a plurality of modulator means, respectively connected with said plurality of optical transmitters, for applying one of a phase modulation and a frequency modulation in synchronization with transmission rates of the respective transmission optical pulses, to the respective transmission optical pulses transmitted by the respective optical transmitters; a plurality of optical receivers, provided in correspondence to said plurality of optical transmission devices, for receiving the transmission optical pulses in respective wavelengths transmitted from the respective optical transmission devices; transmission optical fibers for connecting said plurality of optical transmission devices and said plurality of optical receivers; and a plurality of optical amplifier repeaters provide on the transmission optical fibers, for compensating a loss of the transmission optical fibers.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 5, the first embodiment of an optical transmission system using an optical transmission device according to the present invention will be described in detail.

Figure 1:
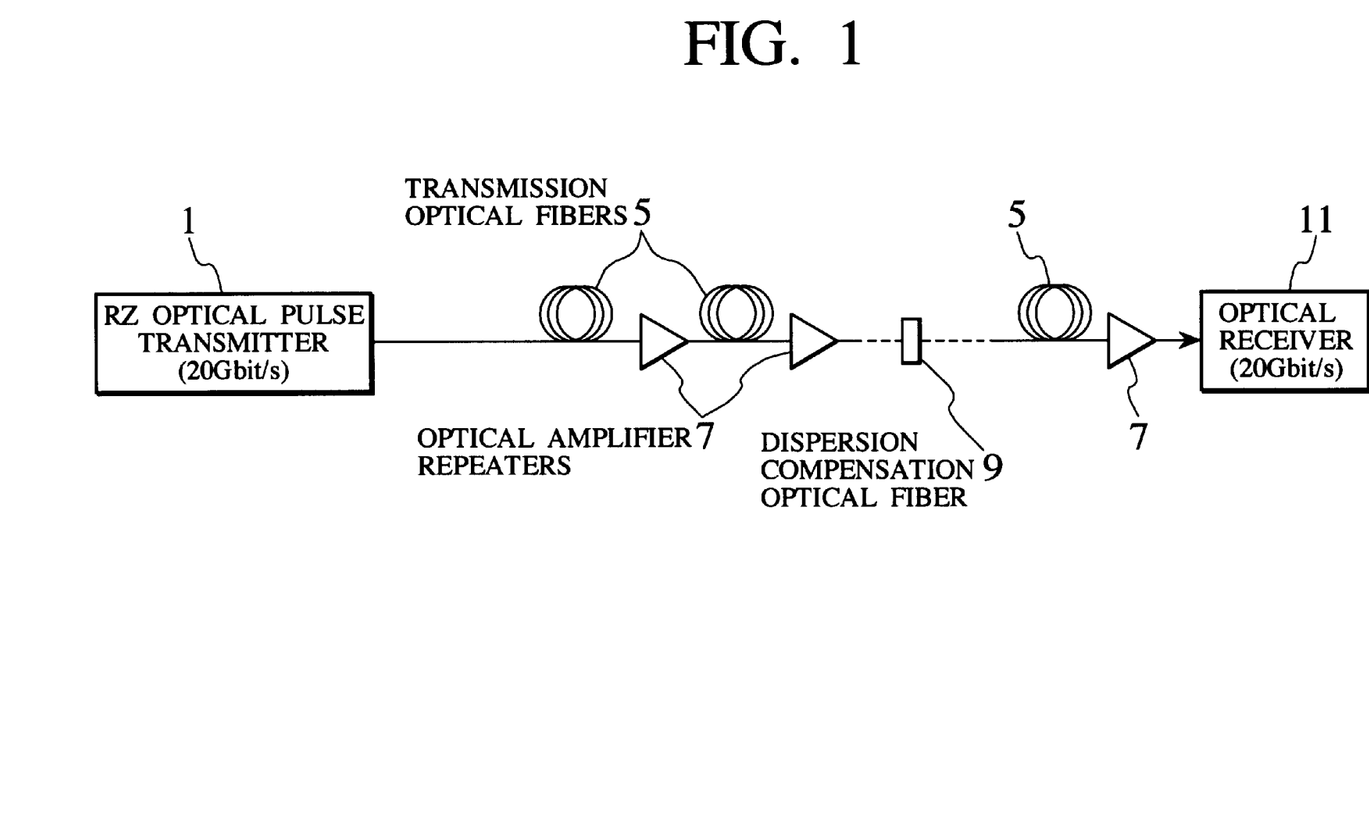
FIG. 1 is a block diagram of an overall configuration of an optical transmission system according to the first embodiment of the present invention.

FIG. 1 shows an overall configuration of the optical transmission system in this first embodiment, where transmission optical pulses transmitted from a 20 Gbit/s return-to-zero (RZ) optical pulse transmitter 1 (hereafter simplified as optical pulse transmitter) are propagated through transmission optical fibers 5, optical amplifier repeaters 7, and dispersion compensation optical fibers 9, and received by a 20 Gbit/s optical receiver 11.

Figure 2:
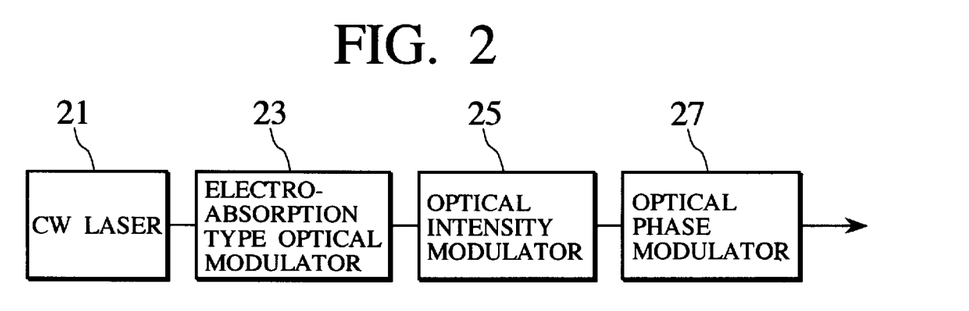
FIG. 2 is a block diagram of one exemplary internal configuration of an optical pulse transmitter in the optical transmission system of FIG. 1.
Figure 3:
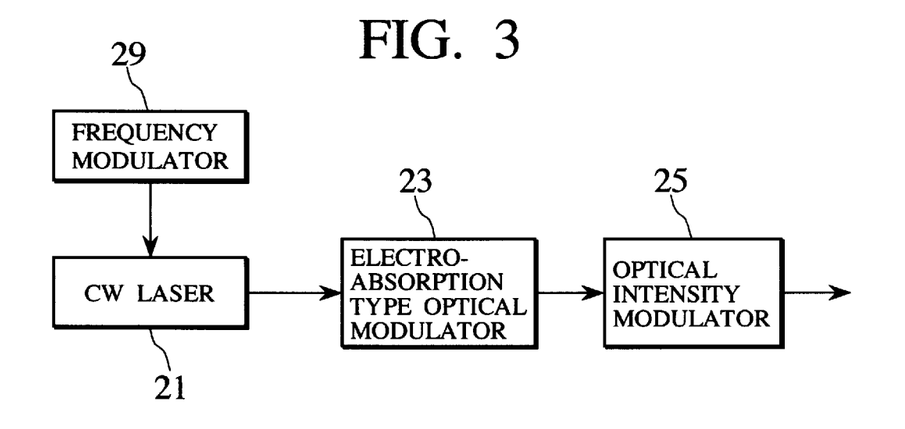
FIG. 3 is a block diagram of another exemplary internal configuration of an optical pulse transmitter in the optical transmission system of FIG. 1.
Figure 4:
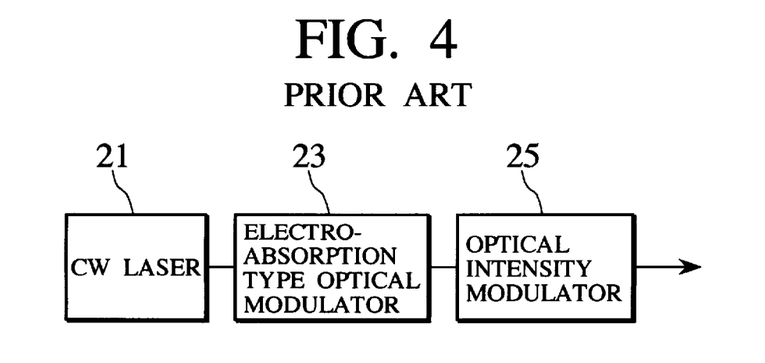
FIG. 4 is a block diagram of a conventional optical transmitter for comparison purpose.

The optical pulse transmitter 1 can have an internal configuration as shown in FIG. 2 or FIG. 3, where FIG. 2 shows an exemplary configuration using an optical phase modulator 27 which will be described in detail first, while FIG. 3 shows an exemplary configuration using a frequency modulator 29 which will be described in detail later. In addition, FIG. 4 shows a typical configuration of a conventional optical transmitter for the sake of comparison. In these FIG. 2, FIG. 3, and FIG. 4, the similar components are identified by the same labels and reference numerals.

In the configuration of FIG. 2, the optical pulse transmitter 1 comprises a CW (Continuous Wave) laser 21, an electro-absorption type optical modulator 23, an optical intensity modulator 25, and an optical phase modulator 27, which are connected in series in this order. Here, the optical phase modulator 27 is provided by a phase modulator using monocrystalline $LiNbO_3$, which is driven by sinusoidal waves of 20 GHz. Also, the electro-absorption type optical modulator 23 is provided by InGaAsP electro-absorption type optical modulator, which is modulated by sinusoidal waves of 20 GHz. Thus this configuration of FIG. 2 differs from the conventional optical transmitter of FIG. 4 by incorporating the optical phase modulator 27.

In this optical pulse transmitter 1 of FIG. 2, the DFB (Distributed FeedBack) laser output light which is continuously oscillating at 1550 nm wavelength band is outputted from the CW laser 21, and this DFB laser output light is converted into the return-to-zero optical pulse sequence which is repeating at 20 GHz by the electro-absorption type optical modulator 23, and 20 Gbit/s digital data signals are superposed onto the return-to-zero optical pulse sequence by the optical intensity modulator 25, so as to generate 20 Gbit/s pseudo-random optical signals. In this first embodiment, the transmission optical pulses transmitted from the 20 Gbit/s return-to-zero optical pulse transmitter 1 are the return-to-zero optical pulses having a timewise waveform with a full width at half maximum equal to 10 ps.

The transmission optical fibers 5 have a total length equal to approximately 9000 km, and a mean zero dispersion wavelength equal to 1553.7 nm which is shorter than the signal light wavelength of 1558 nm. The transmission optical fibers 5 also have a mean wavelength dispersion value D equal to 0.3 ps/km/nm at the wavelength 1558 nm. and a dispersion slope (or a third-order wavelength dispersion) equal to 0.07 ps/km/nm².

Also, 300 sets of the optical amplifier repeaters 7 are provided on the transmission optical fibers 5 at an interval of approximately 30 km in order to compensate for the loss of the optical fibers. The main line of each optical amplifier repeater 7 is formed by an erblum-doped optical fiber, a WDM (Wavelength Division Multiplexing) coupler, and an optical isolator, where the erblum-doped optical fiber is pumped backward by the continuous wave laser beam at the wavelength of 1480 nm as the pumping light which is supplied through the WDM coupler. A sectional average optical power into each span of the transmission optical fibers 5 is approximately 1 dBm.

The dispersion compensation fiber 9 is an optical fiber of 900 m length which has the wavelength dispersion value equal to −100 ps/km/nm at the wavelength of 1558 nm. This dispersion compensation fiber 9 is inserted after every ten repeats on the transmission optical fibers 5 in order to compensate for the accumulated wavelength dispersion value of 90 ps/km/nm per ten repeats on the transmission optical fibers 5.

Most of the optical amplifier repeaters 7 used in this first embodiment does not have a built-in optical filter. while the optical amplifier repeater 7 provided immediately behind the dispersion compensation optical fiber 9 has a built-in optical band-pass filter with the full width at half maximum equal to 3 nm.

The 20 Gbit/s optical receiver 11 has a function for converting received 20 Gbit/s transmission optical signals into electric signals.

Figure 5:
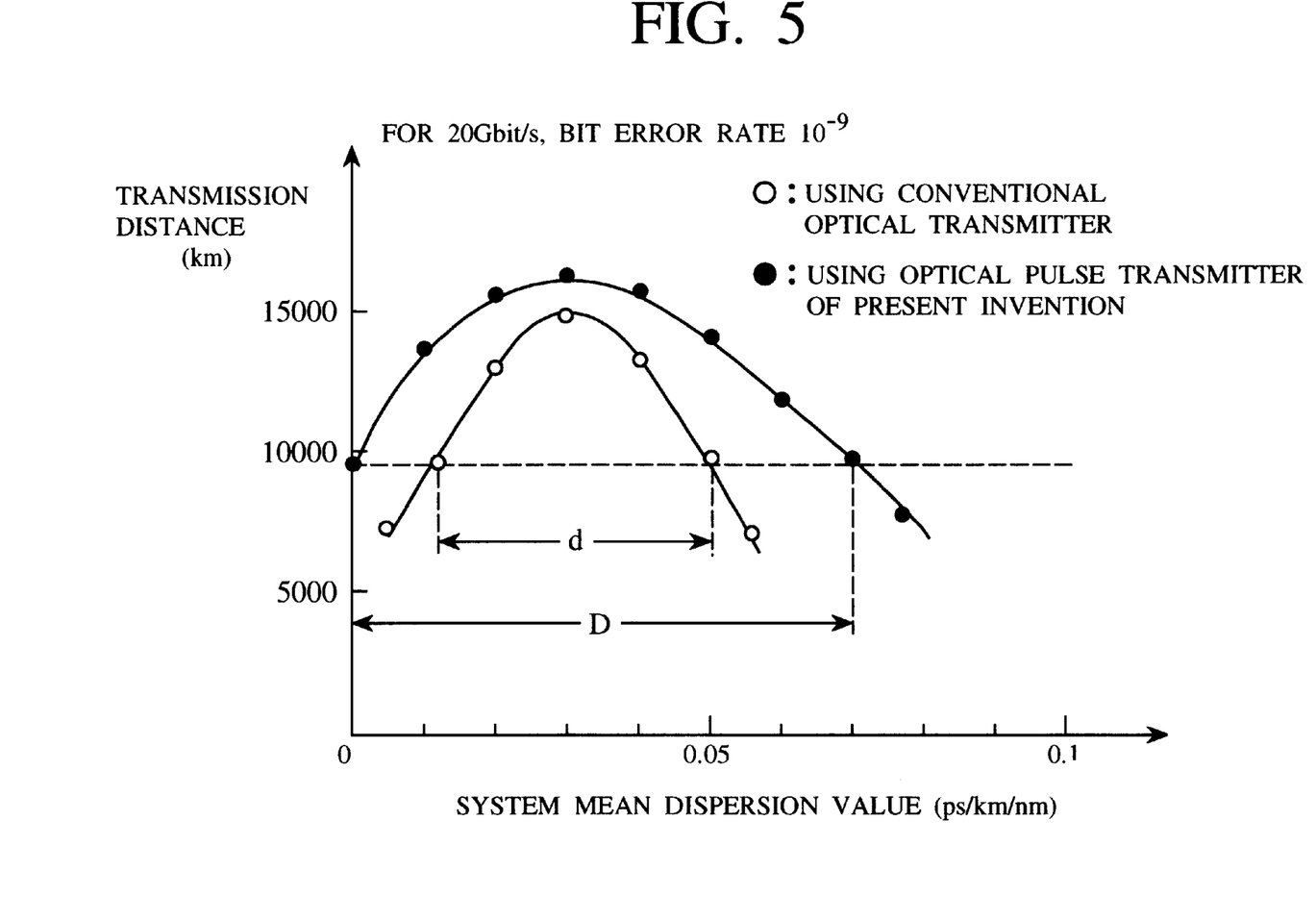
FIG. 5 is a graph of a transmission distance versus a system mean dispersion value for a case of using the optical pulse transmitter of FIG. 2 and a case of using the conventional optical transmitter of FIG. 4.

FIG. 5 shows a result of the experiment to check the transmission distance for which the bit error rate of $10^{-9}$ is obtainable by changing the central wavelengths of the signal wavelength and the optical filter wavelength simultaneously, using the optical pulse transmitter 1 of FIG. 2 described above (which incorporates the optical phase modulator 27) and the conventional optical transmitter of FIG. 4 (which does not incorporate the optical phase modulator 27).

As shown in FIG. 5, in a case of using the conventional optical transmitter of FIG. 4, the wavelengths for which the transmission over 9000 km is possible are limited to a range between 1558.2 nm to 1558.7 nm (corresponding to a range between 0.014 ps/km/nm to 0.05 ps/km/nm in terms of the mean dispersion of the system as a whole). In contrast, in a case of using the optical pulse transmitter 1 of FIG. 2, where the phase modulation is carried out at 20 GHz in synchronization with the transmission signals, the wavelengths for which the transmission over 9000 km is possible are ranging from 1558 nm to 1559 nm (corresponding to a range between 0 to 0.07 ps/knm in terms of the mean dispersion of the system as a whole).

Thus, according to this result of checking the wavelength range for which the transmission over 9000 km is possible, it is confirmed that this wavelength range is approximately 0.5 nm (an interval d indicated in FIG. 5) in a case of using the conventional optical transmitter, whereas this wavelength range is enhanced twice as much to 1 nm (an interval D indicated in FIG. 5) in a case of using the optical pulse transmitter of the present invention in which the phase modulation is made at the transmitting side.

Note here that, instead of using the optical phase modulator 27 as in the above description, it is also possible to achieve the similar effect by applying the frequency modulation in synchronization with the transmission pulses in which the transmission pulses are directly modulated by superposing the sinusoidal waves of 20 GHz obtained by driving the CW laser at 100 mA, for example.

Namely, the optical pulse transmitter 1 may have an internal configuration as shown in FIG. 3, which incorporates the frequency modulator 29 instead of the optical phase modulator 27. In this configuration of FIG. 3, the CW laser 21 is directly modulated by the frequency modulator 29 using small signals of 20 GHz, so as to apply the frequency modulation in synchronization with the transmission pulses. In this manner, the similar effect as in a case of using the configuration of FIG. 2 described above can also be achieved.

Note also that the single wavelength laser and the electro-absorption type optical modulator are used as a short pulse light source in the above description, but it is also possible to use any other return-to-zero (RZ) pulse light source such as the mode locking laser, the gain switching laser, etc. Also, the 20 Gbit/s optical pulse transmitter 1 has a configuration for directly transmitting 20 Gbit/s optical signals in the above description, but it is also possible to realize 20 Gbit/s optical signals by using the optical time division multiplexing in two parts, four parts, eight parts, etc.

Note also that the optical amplifier repeater 7 containing the optical band-pass filter with 3 nm bandwidth is used in the above description for the purpose of removing the non-soliton components, but the bandwidth, the shape, and the insertion interval of the optical band-pass filter are not necessarily limited to those described above, and first-order optical filters, second-order Butterworth filters, or second-order Bessel filters, which have the bandwidth other than that used in the above description may be provided after every several repeats on the transmission optical fibers. In addition, an element having the similar function as the optical filter described above such as a saturable absorber may be used instead of or in conjunction with the optical filter used in the above description.

Figure 6:
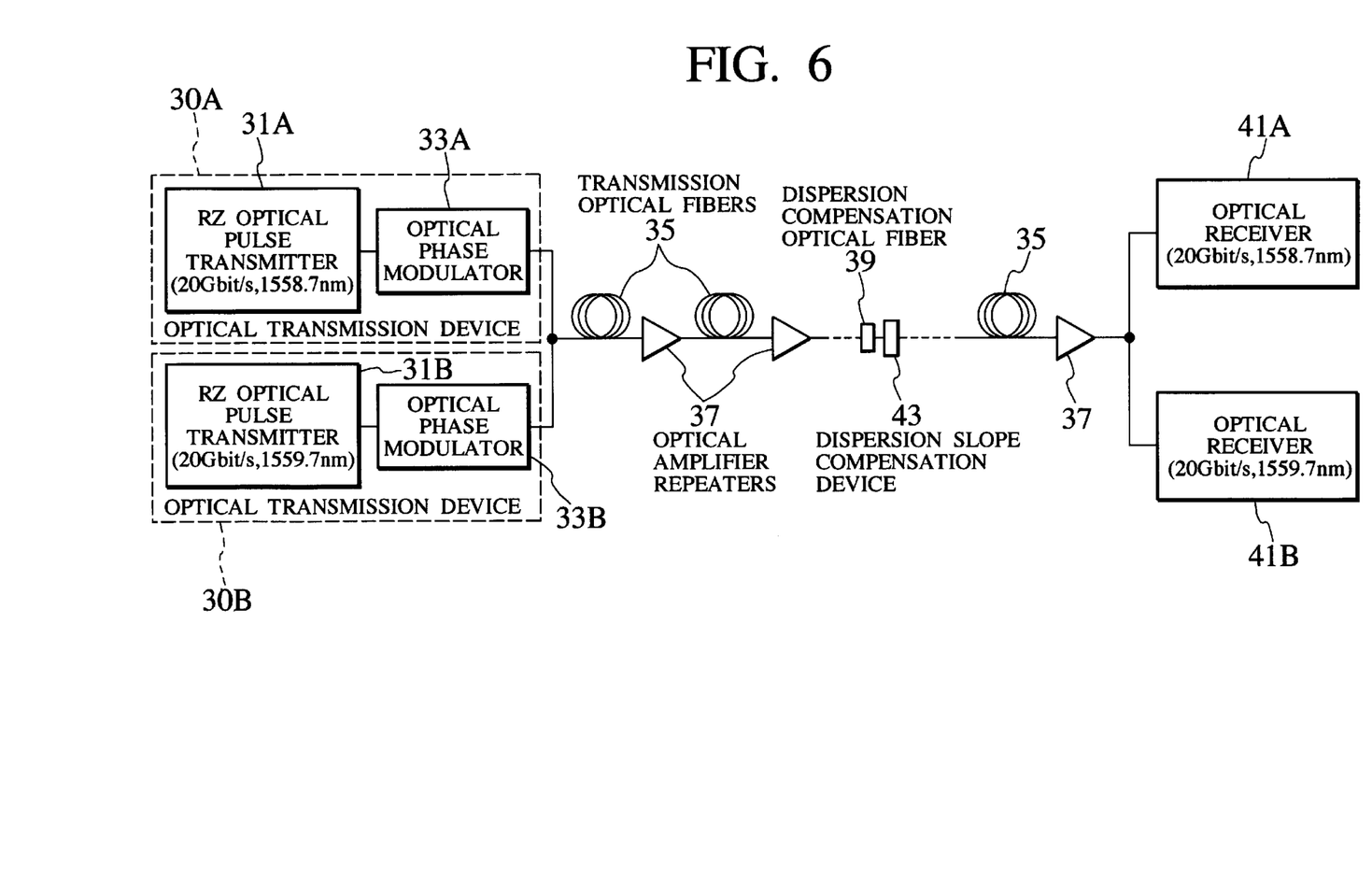
FIG. 6 is a block diagram of an overall configuration of an optical transmission system according to the second embodiment of the present invention.
Figure 7:
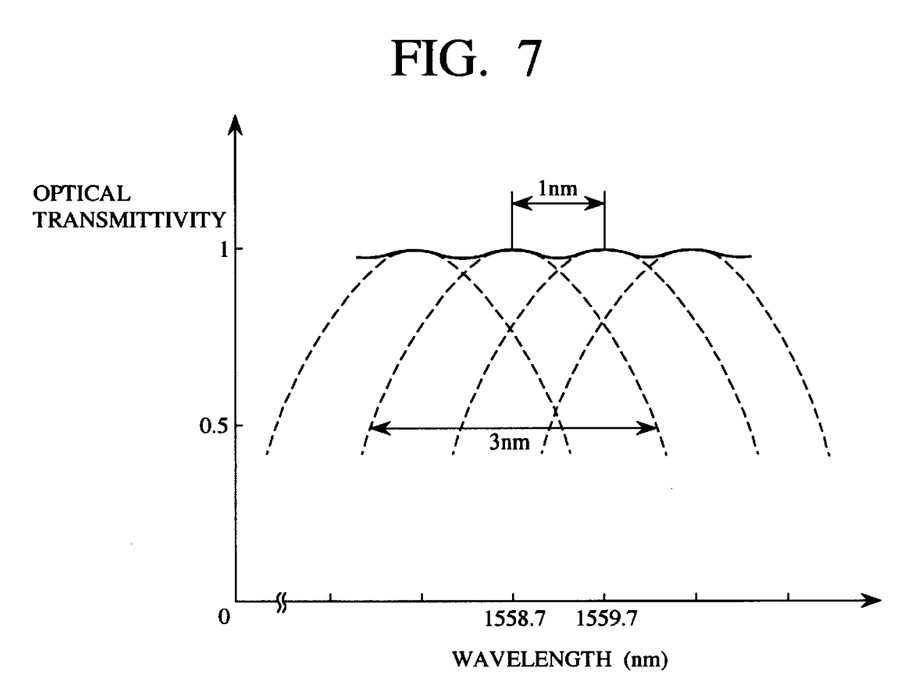
FIG. 7 is a graph showing an optical transmission wavelength characteristic of a Fabry-Pérot type optical filter used in the optical transmission system of FIG. 6.

Referring next to FIG. 8 to FIG. 7, the second embodiment of an optical transmission system using an optical wavelength division multiplexing (WDM) optical transmission apparatus according to the present invention will be described in detail.

FIG. 6 shows an overall configuration of the optical transmission system in this second embodiment, in which one 20 Gbit/s return-to-zero optical pulse transmitter 31A for the wavelength 1558.7 nm and another 20 Gbit/s return-to-zero optical pulse transmitter 31B for the wavelength 1559.7 nm are provided in parallel, and connected with optical phase modulators 33A and 33B, respectively, where the optical phase modulators 33A and 33B are modulated at 20 GHz in synchronization with the optical signals outputted from the optical pulse transmitters 31A and 31B, respectively. Here, each 20 Gbit/s return-to-zero optical pulse transmitter 31 and a corresponding optical phase modulator 33 form an optical transmission device 30 similar to the optical pulse transmitter of FIG. 2 or FIG. 3 used in the first embodiment described above, and these two optical transmission devices 30A and 30B form a wavelength division multiplexing optical transmission apparatus.

The transmission optical pulses transmitted from these two optical transmission devices 30A and 30B are propagated through transmission optical fibers 35, optical amplifier repeaters 37, dispersion compensation optical fibers 39, and dispersion slope compensation devices 43, and received by two 20 Gbit/s optical receivers 41A and 41B for the wavelengths 1558.7 nm and 1559.7 nm, respectively.

The transmission optical fibers 35 have a total length equal to approximately 9000 km, and a mean zero dispersion wavelength equal to 1553.7 nm which is shorter than the signal light wavelengths of 1558.7 nm and 1559.7 nm. The transmission optical fibers 5 also have a mean wavelength dispersion value D equal to 0.3 ps/km/nm at the wavelength 1558 nm, and a dispersion slope (or a third-order wavelength dispersion) equal to 0.07 ps/km/nm$^2$. Then, 300 sets of the optical amplifier repeaters 37 are provided on the transmission optical fibers 35 at an interval of approximately 30 km in order to compensate for the loss of the optical fibers, similarly as in the first embodiment described above.

The dispersion compensation fiber 39 is an optical fiber of 900 m length which has the wavelength dispersion value equal to −100 ps/km/nm at the wavelength of 1558 nm.

This dispersion compensation fiber 39 is inserted after every ten repeats on the transmission optical fibers 35 in order to compensate for the accumulated wavelength dispersion value of 90 ps/km/nm per ten repeats on the transmission optical fibers 35, similarly as in the first embodiment described above. In addition, in this second embodiment, a Fabry-Pérot type optical filter having FSR (Free Spectral Range) equal to 1 nm as indicated in the optical transmission wavelength characteristic of the Fabry-Pérot type optical filter shown in FIG. 7 is also provided at every ten repeats on the transmission optical fibers 35.

The dispersion slope compensation device 43 is a fiber type chirped fiber grating which has the zero dispersion wavelength equal to 1558.7 nm and the dispersion slope equal to −21 ps/km/nm$^2$. This dispersion slope compensation device 43 is inserted after every ten repeats on the transmission optical fibers 35. This dispersion slope compensation device 43 is set to compensate the dispersion slope of the optical fibers such that the mean dispersion value at each wavelength takes a nearly uniform value of 0.05 ps/km/nm after passing through this dispersion slope compensation device 43.

Note here that dispersion flattened fibers with chromatic dispersion of 0.47 ps/km/nm and dispersion slope equal to almost zero can be used instead of the transmission fibers and dispersion slope compensators.

In this optical transmission system of FIG. 6, when the mean dispersion is set equal to 0.05 ps/km/nm, the excessive spread of the spectrum of transmission pulses can be avoided, while the interferences between two wavelengths can be prevented even in a case of the wavelength division multiplexing transmission, and it becomes possible to realize the transmission over 9000 km for both wavelengths.

The 20 Gbit/s optical receiver 41A for the wavelength 1558.7 nm and the 20 Gbit/s optical receiver 41B for the wavelength 1559.7 nm are used for receiving 20 Gbit/s transmission optical signals transmitted from the optical transmission devices 30A and 30B, respectively.

Note that the second embodiment is described for a specific case of wavelength division multiplexing for two wavelengths in the above description, but the present invention is not limited to this particular case alone, and the wavelength division multiplexing of any desired number of wavelengths can be similarly realized.

As described, according to the present invention, the possible transmission distance in the single wavelength transmission can be enhanced by adding the phase modulation or the frequency modulation to the return-to-zero optical pulses. Also, the optimum wavelength range that has conventionally been limited by the residual wavelength dispersion can be enhanced, so that the wavelengths without the excessive spectrum spread and with nearly uniform residual dispersion values can be selected as new optimum wavelengths for the wavelength division multiplexing purpose, and therefore the conventionally encountered problem of the interferences among channels in the wavelength division multiplexing can be reduced and it becomes possible to realize the multiple wavelength transmission.

In other words, by applying the phase modulation or the frequency modulation in synchronization with the transmission rate to the transmission optical pulses at the transmission device side, the timing jitter can be suppressed and the available wavelength range can be enhanced. By means of this, the single wavelength transmission characteristic can be improved. In addition, in a case of multiple wavelengths transmission, the wavelengths for which the residual dispersions are nearly uniform and the excessive spectrum spread is absent can be set by carrying out the dispersion slope compensation, so that it becomes possible to realize a high density wavelength division multiplexing transmission.

Thus, according to the present invention, it is possible to realize the multiple wavelength multiplexing transmission while maintaining the channel bit rate between 10 Gbit/s to 20 Gbit/s, and therefore it is possible to realize a very large capacity, long distance optical transmission system.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical transmission device, comprising:
   an optical transmitter using a short pulse light source, for transmitting transmission optical pulses by superposing digital data signals onto return-to-zero optical pulses; and
   modulator means for applying one of a phase modulation and a frequency modulation in synchronization with a transmission rate of the transmission optical pulses, to the transmission optical pulses transmitted by the optical transmitter, so as to suppress a timing jitter in the transmission optical pulses.

2. The device of claim 1, wherein the modulator means is an optical phase modulator for modulating a phase of the transmission optical pulses transmitted by the optical transmitter.

3. The device of claim 1, wherein the modulator means is a frequency modulator for directly modulating a frequency of the return-to-zero optical pulses used in the optical transmitter.

4. A wavelength division multiplexing optical transmission apparatus, comprising:
   a plurality of optical transmitters each using a short pulse light source, for transmitting respective transmission optical pulses in different wavelengths according to a wavelength division multiplexing scheme by superposing respective digital data signals onto return-to-zero optical pulses; and
   a plurality of modulator means, respectively connected with said plurality of optical transmitters, for applying one of a phase modulation and a frequency modulation in synchronization with transmission rates of the respective transmission optical pulses, to the respective transmission optical pulses transmitted by the respective optical transmitters, so as to suppress timing jitters in the respective transmission optical pulses.

5. The apparatus of claim 4, wherein each modulator means is an optical phase modulator for modulating a phase of the corresponding transmission optical pulses transmitted by the corresponding optical transmitter.

6. The apparatus of claim 4, wherein each modulator means is a frequency modulator for directly modulating a frequency of the return-to-zero optical pulses used in the corresponding optical transmitter.

7. An optical transmission system, comprising:
   an optical transmission device formed by an optical transmitter using a short pulse light source, for transmitting transmission optical pulses by superposing digital data signals onto return-to-zero optical pulses, and modulator means for applying one of a phase modulation and a frequency modulation in synchronization with a transmission rate of the transmission optical pulses, to the transmission optical pulses transmitted by the optical transmitter, so as to suppress a timing jitter in the transmission optical pulses; and
   an optical receiver for receiving the transmission optical pulses transmitted from the optical transmission device;
   transmission optical fibers for connecting the optical transmission device and the optical receiver; and
   a plurality of optical amplifier repeaters provided on the transmission optical fibers, for compensating a loss of the transmission optical fibers.

8. The system of claim 7, wherein the modulator means is an optical phase modulator for modulating a phase of the transmission optical pulses transmitted by the optical transmitter.

9. The system of claim 7, wherein the modulator means is a frequency modulator for directly modulating a frequency of the return-to-zero optical pulses used in the optical transmitter.

10. The system of claim 7, wherein the transmission optical fibers have a mean zero dispersion wavelength shorter than a wavelength of the transmission optical pulses.

11. The system of claim 7, wherein the transmission optical fibers have an accumulated wavelength dispersion value which globally increases through the transmission optical fibers, the transmission optical fibers are divided into a plurality of sections, and the system further comprises:
   a wavelength dispersion medium provided at each section of the transmission optical fibers, for locally compensating the accumulated wavelength dispersion value within each section.

12. The system of claim 11, wherein the wavelength dispersion medium is a dispersion compensation optical fiber.

13. An optical transmission system, comprising:

a plurality of optical transmission devices formed by a plurality of optical transmitters each using a short pulse light source, for transmitting respective transmission optical pulses in different wavelengths according to a wavelength division multiplexing scheme by superposing respective digital data signals onto return-to-zero optical pulses, and a plurality of modulator means, respectively connected with said plurality of optical transmitters, for applying one of a phase modulation and a frequency modulation in synchronization with a transmission rates of the respective transmission optical pulses, to the respective transmission optical pulses transmitted by the respective optical transmitters, so as to suppress timing jitters in the respective transmission optical pulses; and a plurality of optical receivers, provided in correspondence to said plurality of optical transmission devices, for receiving the transmission optical pulses in respective wavelengths transmitted from the respective optical transmission devices;

transmission optical fibers for connecting said plurality of optical transmission devices and said plurality of optical receivers; and a plurality of optical amplifier repeaters provided on the transmission optical fibers, for compensating a loss of the transmission optical fibers.

14. The system of claim 13, wherein each modulator means is an optical phase modulator for modulating a phase of the corresponding transmission optical pulses transmitted by the corresponding optical transmitter.

15. The system of claim 13, wherein each modulator means is a frequency modulator for directly modulating a frequency of the return-to-zero optical pulses used in the corresponding optical transmitter.

16. The system of claim 13, wherein the transmission optical fibers have a mean zero dispersion wavelength shorter than a wavelength of any of the transmission optical pulses.

17. The system of claim 13, wherein the transmission optical fibers have an accumulated wavelength dispersion value which globally increases through the transmission optical fibers, the transmission optical fibers are divided into a plurality of sections, and the system further comprises:

a wavelength dispersion medium provided at each section of the transmission optical fibers, for locally compensating the accumulated wavelength dispersion value within each section.

18. The system of claim 17, wherein the wavelength dispersion medium is a dispersion compensation optical fiber.

19. The system of claim 13, wherein the transmission optical fibers are divided into a plurality of sections, and the system further comprises:

a dispersion slope compensation device provided at each section of the transmission optical fibers, for compensating a dispersion slope of the transmission optical fibers within each section, so as to set mean dispersion values for different wavelengths substantially uniform.

20. The system of claim 19, wherein the dispersion slope compensation device is a fiber type chirped fiber grating.

* * * * *